(12) United States Patent
Chen

(10) Patent No.: US 7,131,462 B1
(45) Date of Patent: Nov. 7, 2006

(54) GAS CONTROL VALVE ASSEMBLY

(76) Inventor: Wen Chou Chen, No. 4, Lane 657, Chung Cheng Road, Shulin, Taipei County 238 (TW)

( * ) Notice: Subject to any disclaimer, the term of this patent is extended or adjusted under 35 U.S.C. 154(b) by 432 days.

(21) Appl. No.: 10/751,834

(22) Filed: Jan. 6, 2004

(51) Int. Cl.
*G05D 7/06* (2006.01)

(52) U.S. Cl. .......................................... 137/883; 137/66

(58) Field of Classification Search .................. 137/66, 137/613, 65, 883
See application file for complete search history.

(56) References Cited

U.S. PATENT DOCUMENTS 4,044,794 A * 8/1977 Matthews .................... 137/613

6,536,459 B1 * 3/2003 Huang ......................... 137/66

* cited by examiner

*Primary Examiner*—Kevin Lee

(57) ABSTRACT

A gas control valve assembly includes a valve seat, the valve seat having a gas inlet, first and second gas outlets, a gas passageway in communication between the gas inlet and the gas outlets, and three mounting holes in communication with the gas passageway, a first electromagnetic valve mounted in the first mounting hole and adapted to control the flowing of fuel gas from the gas passageway to the second mounting hole and the first gas outlet, a second electromagnetic valve mounted in the second mounting hole and adapted to control the flowing of fuel gas from the gas passageway to the second gas outlet, and a third electromagnetic valve mounted in the third mounting hole and adapted to control the flowing of fuel gas to the second gas outlet independently or with the second electromagnetic valve.

18 Claims, 9 Drawing Sheets

GAS CONTROL VALVE ASSEMBLY

BACKGROUND OF THE INVENTION

1. Field of th Invention

The present invention relates to a gas control valve assembly and, more particularly, to such a gas control valve assembly that can be controlled to turn on/off the supply of fuel gas, can also be controlled to regulate the flow rate of supplied fuel gas.

2. Description of the Related Art

A valve is a device which controls the flow of a liquid or gas through a pipe by opening and closing the passage. In a hot water heater or furnace, a gas valve may be used to control the supply of fuel gas by means of pressure difference. A gas valve of this kind comprises a valve flap and two pressure chambers at two sides of the valve flap. When the pressure of the two pressure chambers is in balance, a small flow rate of fuel gas passes out of the first pressure chamber to the gas nozzle for ignition by sparked discharged from a discharging electrode to produce an ignition flame. When the induction electrode detected the presence of the ignition flame, the gas inlet of the first pressure chamber is closed to lower the pressure of the first pressure chamber, causing the valve flap to change the position for enabling a big flow rate of fuel gas to pass out of the gas valve to the gas burner for burning by the ignition flame to produce a master flame for heating. This design of gas valve cannot regulate the flow rate of fuel gas passing to the gas burner. For controlling the flow rate of fuel gas, an external gas flow rate regulator shall be used.

SUMMARY OF THE INVENTION

The present invention has been accomplished under the circumstances in view. It is the main object of the present invention to provide a gas control valve assembly, which can be controlled to turn on/off the supply of fuel gas, can also be controlled to regulate the flow rate of supplied fuel gas.

To achieve this and other objects of the present invention, the gas control valve assembly comprises a valve seat, the valve seat having a gas inlet, first and second gas outlets, a gas passageway in communication between the gas inlet and the gas outlets, and three mounting holes in communication with the gas passageway, a first electromagnetic valve mounted in the first mounting hole and adapted to control the flowing of fuel gas from the gas passageway to the second mounting hole and the first gas outlet, a second electromagnetic valve mounted in the second mounting hole and adapted to control the flowing of fuel gas from the gas passageway to the second gas outlet, and a third electromagnetic valve mounted in the third mounting hole and adapted to control the flowing of fuel gas to the second gas outlet independently or with the second electromagnetic valve.

DETAILED DESCRIPTION OF THE PREFERRED EMBODIMENT

Figure 1:
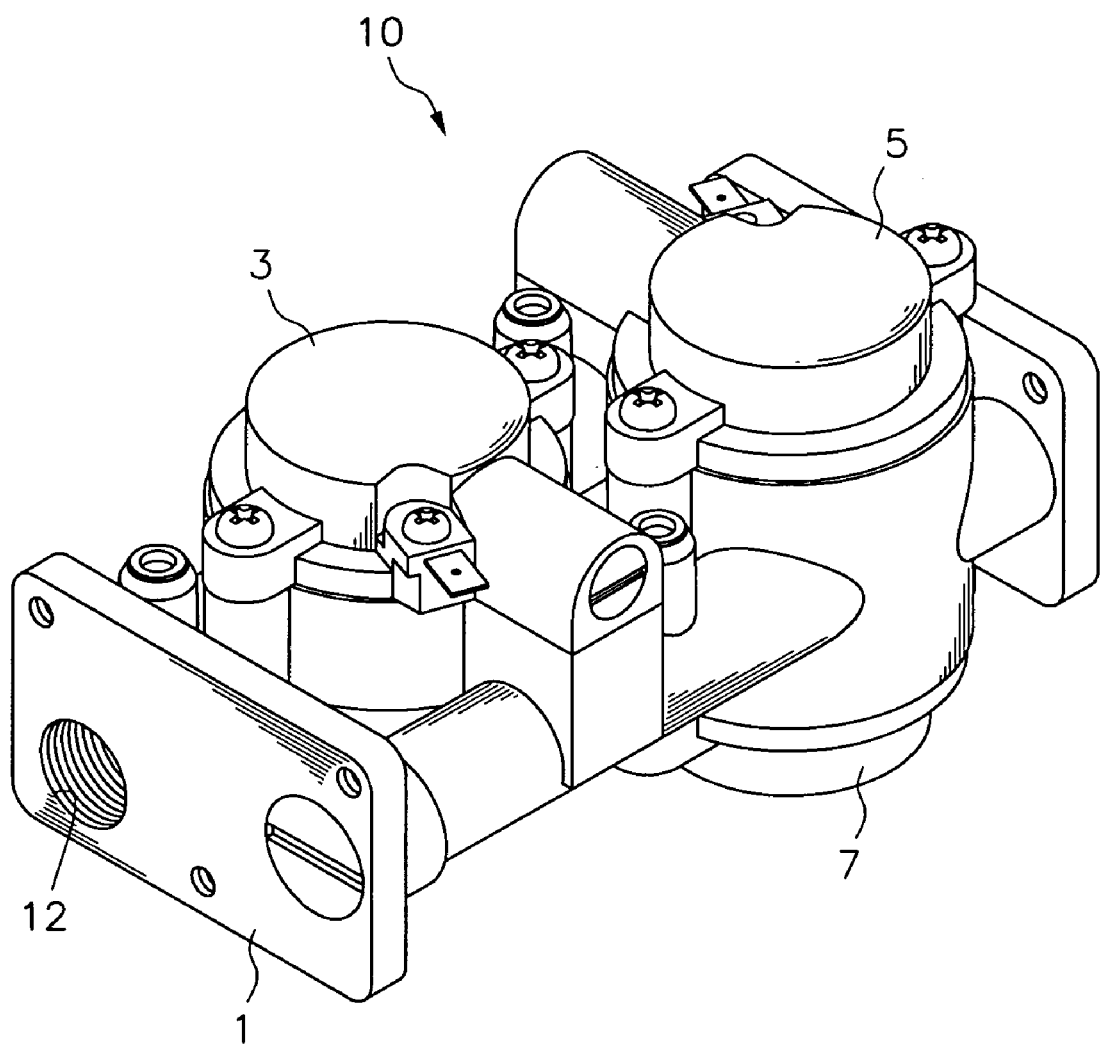
FIG. 1 is an elevational view of a gas control valve assembly according to the present invention.
Figure 2:
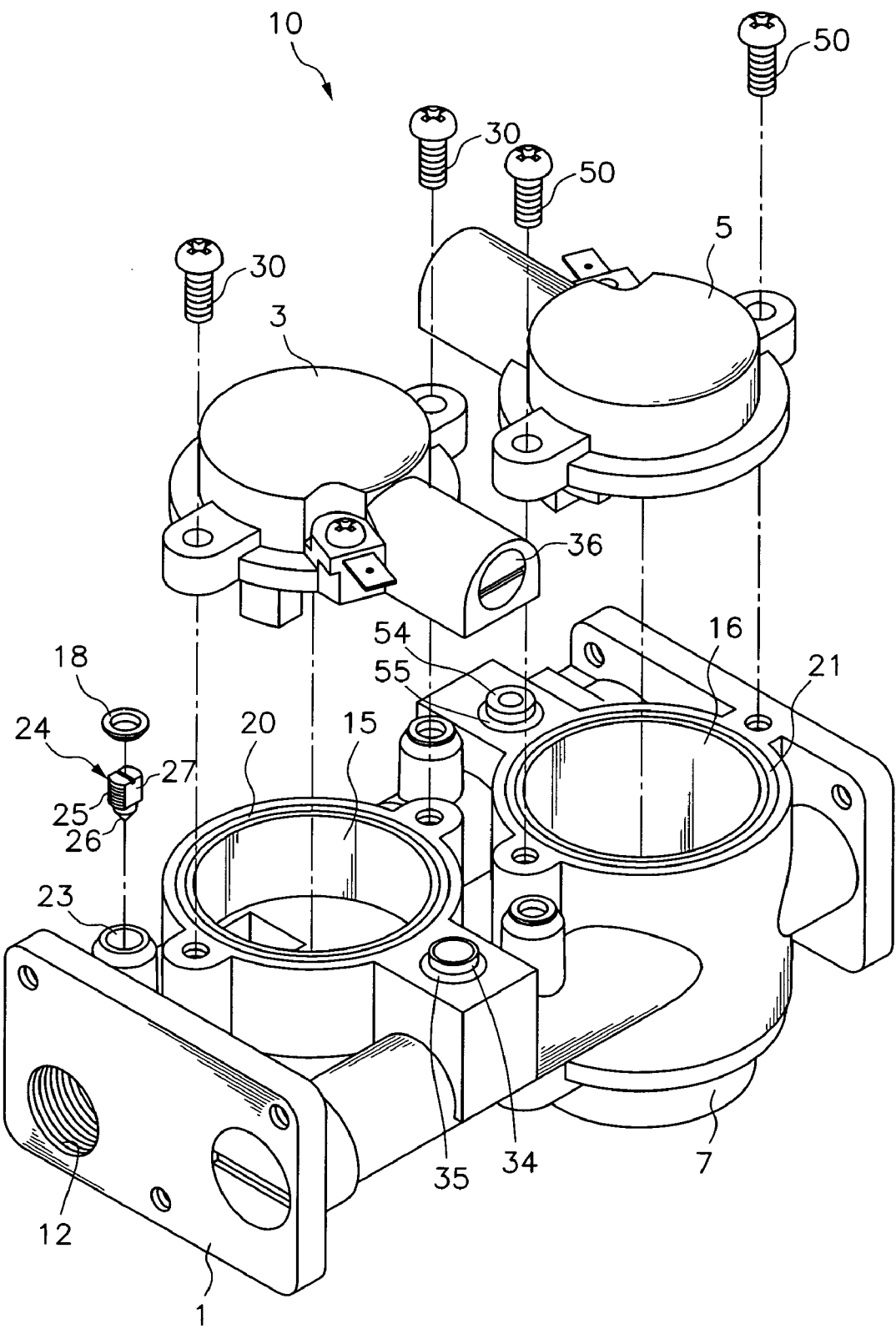
FIG. 2 is an exploded view of the gas control valve assembly according to the present invention.
Figure 3:
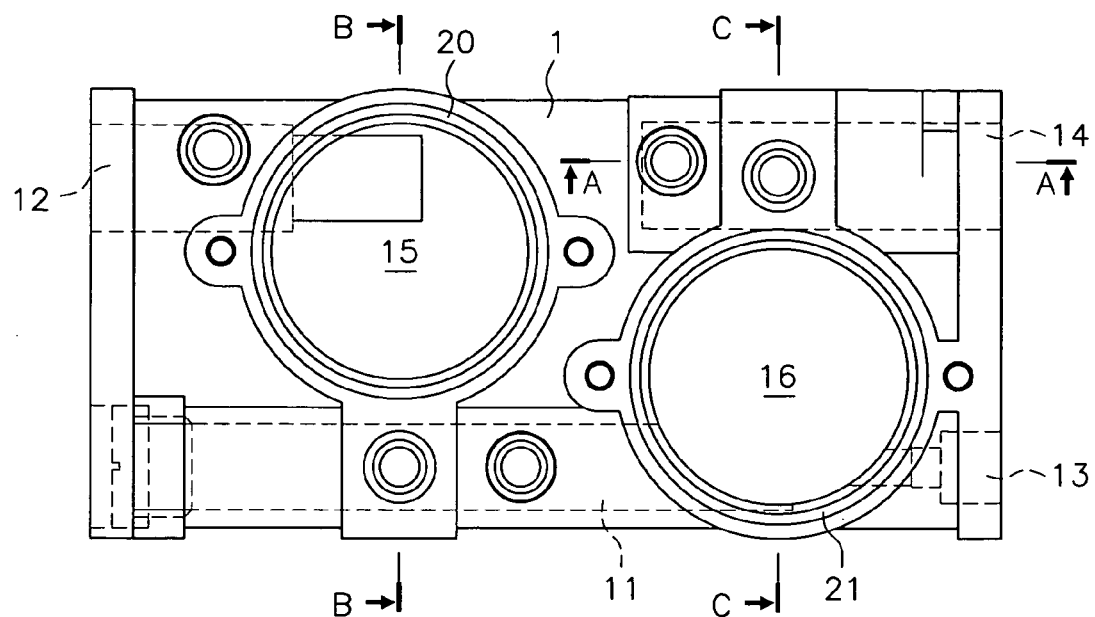
FIG. 3 is a top view of the valve seat for the gas control valve assembly according to the present invention.

Referring to FIGS. 1~3, a gas control valve assembly 10 is shown comprising a valve seat 1 defining therein a gas passageway 11. The gas passageway 11 has a gas inlet 12 connected to a fuel gas source, a first gas outlet 13 connected to a gas nozzle (not shown), and a second gas outlet 14 connected to a gas burner (not shown). The valve seat 1 further comprises a first mounting hole 15, a second mounting hole 16, and a third mounting hole 17 (see FIG. 6). The mounting holes 15~17 are disposed between the first gas inlet 12 and the gas outlets 13 and 14, forming a part of the gas passageway 11. A first electromagnetic valve 3 is fastened to the first mounting hole 15 with screws 30, and adapted to control the flowing of fuel gas from the gas passageway 11 to the second mounting hole 16, the third mounting hole 17 and the first gas outlet 13. A second electromagnetic valve 5 is fastened to the second mounting hole 16 with screws 50, and adapted to control the flowing of fuel gas from the gas passageway 11 to the second gas outlet 14. The third mounting hole 17 is provided at the back side (the bottom side in FIGS. 1 and 2) in vertical alignment with the second mounting hole 16. A third electromagnetic valve 7 is fastened to the third mounting hole 17 with screws (not shown), and adapted to control the flowing of fuel gas from the gas passageway 11 to the second gas outlet 14. The electromagnetic valves 3, 5, and 7 are normal-close valves, i.e., the valve stems 31, 51, and 71 are regularly maintained in the close position. O-rings 20~22 are respectively mounted in the mounting holes 15~17 to seal the gap between the respective mounting holes and the respective electromagnetic valves. Because the electromagnetic valves of the known art, no further detailed description in this regard is necessary.

When the gas range is in OFF position, fuel gas flows from the gas inlet 12 through the gas passageway 11 to the first mounting hole 15.

Figure 7:
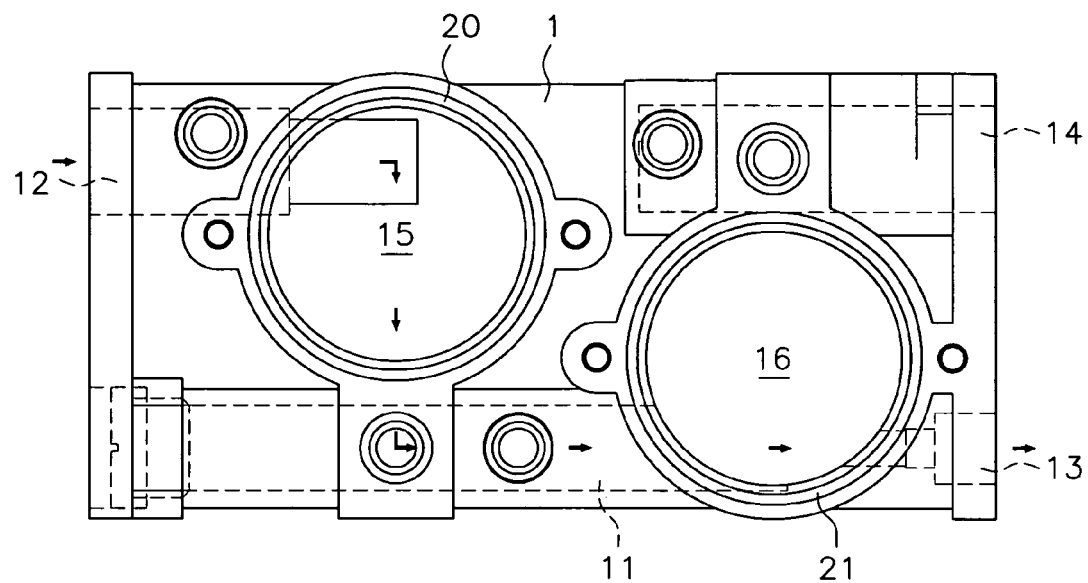
FIG. 7 is similar to FIG. 3 but showing the first electromagnetic valve activated and fuel gas passed out of the output port of the first electromagnetic valve (see the arrowhead).

Referring to FIG. 7, when switched the gas range to ON position, the valve stem 31 of the first electromagnetic valve 3 is moved to the open position, enabling fuel gas to flow from the first mounting hole 15 through the output port 33 of the first electromagnetic valve 3 into the gas passageway 11 and then to flow from the gas passageway 11 through the second mounting hole 16 and the third mounting hole 17 to the first gas outlet 13 and then the gas nozzle for ignition by sparks discharged from the discharging electrode of the electronic igniter (not shown) to produce an ignition flame.

Figure 8:
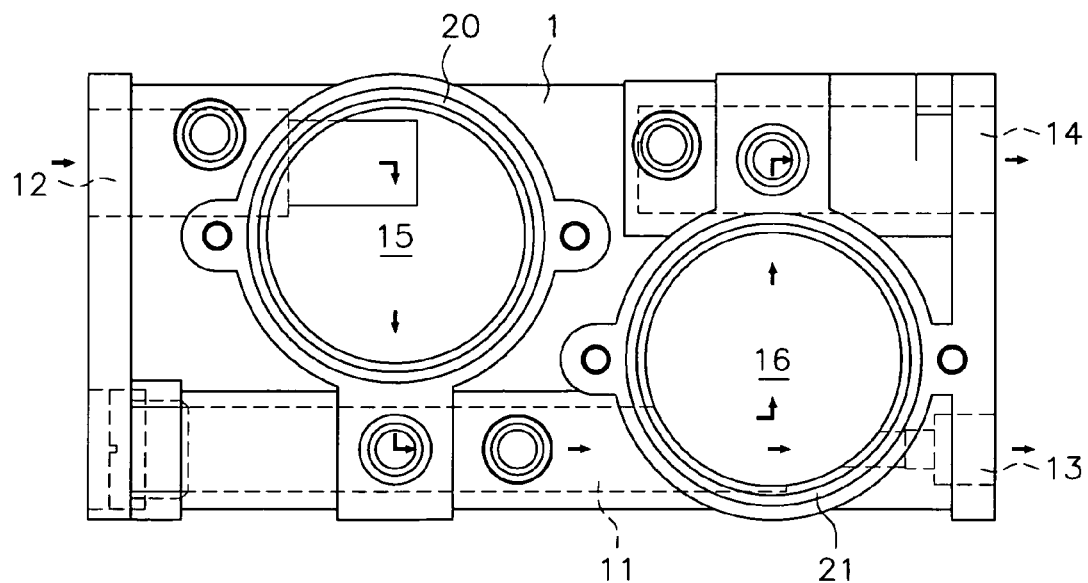
FIG. 8 is similar to FIG. 7 but showing the first electromagnetic valve and the second electromagnetic valve activated and fuel gas passed out of the output port of the second electromagnetic valve.

Referring to FIG. 8, upon the presence of an ignition flame, the flame induction electrode (not shown) is induced to stops the electronic igniter from discharging high voltage, and simultaneously to connect electricity to the second electromagnetic valve 5 and/or the third electromagnetic valve 7, causing the second electromagnetic valve 5 and/or the third electromagnetic valve 7 to move the valve stem 51 and/or valve stem 71 to the open position, for enabling fuel gas to pass from the second mounting hole 16 (or third mounting hole 17) through the output port 53 of the second electromagnetic valve 5 and/or the output port 73 of the third electromagnetic valve 7 into the gas passageway 11 and then to flow from the gas passageway 11 to the second gas outlet 14 and then the gas burner for burning by the aforesaid ignition flame to produce a master flame for heating.

The operator may operate the remote controller (not shown) to select the low-flame mode. At this time, only the third electromagnetic valve 7 is opened, and a low flow rate of fuel gas passes out of the second gas outlet 14 to the gas burner for burning. When the user changed the setting from the low-flame mode to the medium-flame mode, only the second electromagnetic valve 5 is opened. At this time, a medium flow rate of fuel gas passes out of the second gas outlet 14 to the gas burner for burning. When the user changed the setting to the high-flame mode, the second electromagnetic valve 5 and the third electromagnetic valve 7 are simultaneously opened, and a high flow rate of fuel gas passes out of the second gas outlet 14 to the gas burner for burning. Therefore, the gas control valve assembly 10 can conveniently be controlled to regulate the flow rate of fuel gas and to further control the intensity of the flame.

When turned off power supply, all the electromagnetic valves are off and returned to the respective close position to stop fuel gas from passing through the gas passageway 11.

Figure 4:
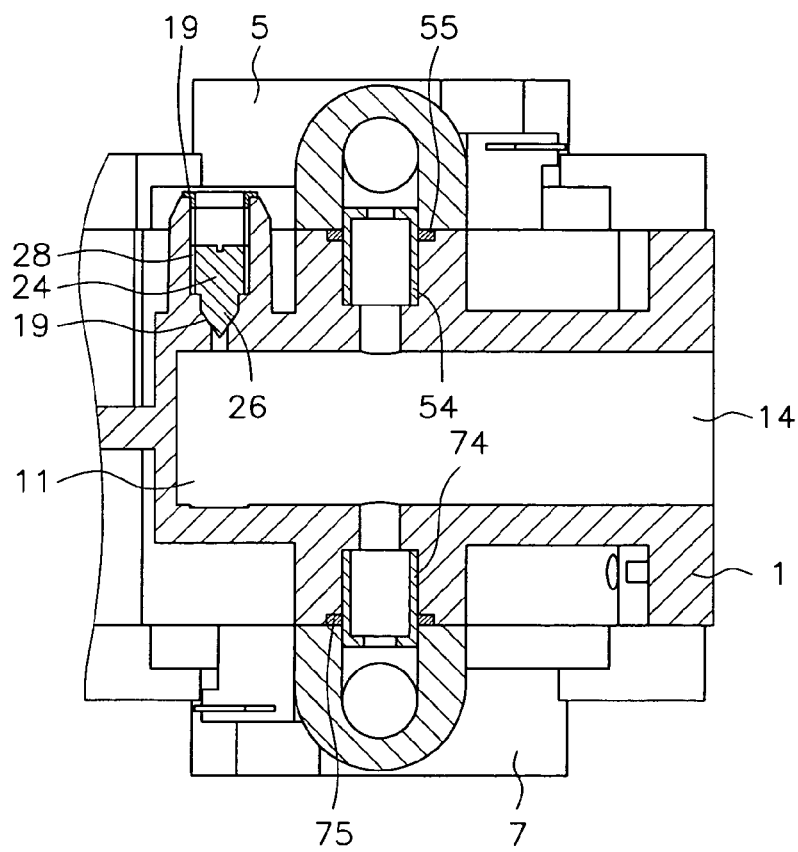
FIG. 4 is a sectional view taken along line A—A of FIG. 3.

Referring to FIGS. 2 and 4, a screw hole 23 is formed in the valve seat 1 between the second mounting hole 16 (or third mounting hole 17) and the second gas outlet 14 and connected to the gas passageway 11 through a tapered gas hole 19, and a detection screw 24 is threaded into the screw hole 23. The detection screw 24 comprises a threaded shank 25 threaded into the screw hole 23, a conical tip 26 axially extended from one end of the threaded shank 25 and adapted to control the passage of the tapered gas hole 19, and two cut planes 27 at two sides of the threaded shank 25. When rotating the screw 24 counter-clockwise, the conical tip 26 is moved away from the tapered gas hole 19, for enabling fuel gas to pass through the gaps 28 between the periphery of the screw hole 23 and the cut planes 27 to a flow indicator or pressure gage that measures the flow rate or gas pressure in the gas passageway 11. Similar detection screws (not shown) are respectively installed in the gas passageway 11 between the gas inlet 12 and the first mounting hole 15 and between the first mounting hole 15 and the second (or third) mounting hole 16 (or 17) to detect gas flow rate or pressure in different segments of the gas passageway 11. Further, a retainer 18 is fastened to the outer end of the screw hole 23 to stop the detection screw 24 from falling out of the screw hole 23. Alternatively, the outer end of the screw hole 24 may be made smaller than the outer diameter of the detection screw 24 to stop the detection screw 24 from falling out of the screw hole 23.

Figure 9:
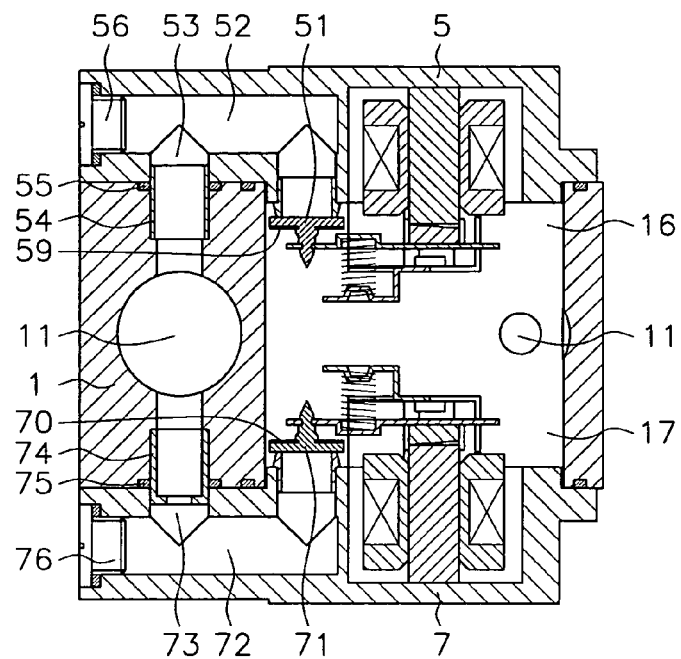
FIG. 9 is a sectional view substantially same as FIG. 6.

For easy fabrication, the aforesaid three electromagnetic valves have the same structure. However, for the passing of different gas flow rates, a first barrel 34 is installed in the output port 33 of the first electromagnetic valve 3 (see FIG. 5). The first barrel 34 has one end mounted with an O-ring 35 and the other end inserted into the valve seat 1 to connect the first electromagnetic valve 3 to the gas passageway 11. A second barrel 54 is installed in the output port 53 of the second electromagnetic valve 5 (see FIG. 6). The inner diameter of the second barrel 54 is relatively smaller than the first barrel 34. The second barrel 54 has one end mounted with an O-ring 55 and the other end inserted into the valve seat 1 to connect the second electromagnetic valve 5 to the gas passageway 11. A third barrel 74 is installed in the output port 73 of the third electromagnetic valve 7 (see FIG. 6). The inner diameter of the third barrel 74 is relatively smaller than the second barrel 54. The third barrel 74 has one end mounted with an O-ring 75 and the other end inserted into the valve seat 1 to connect the third electromagnetic valve 7 to the gas passageway 11. By means of the use of different barrels 34, 54, and 74, the gas flow rate is relatively controlled. Alternatively, the barrels 54 and 74 can be made having an inner diameter equal to the barrel 34 (see FIG. 9).

Figure 10:
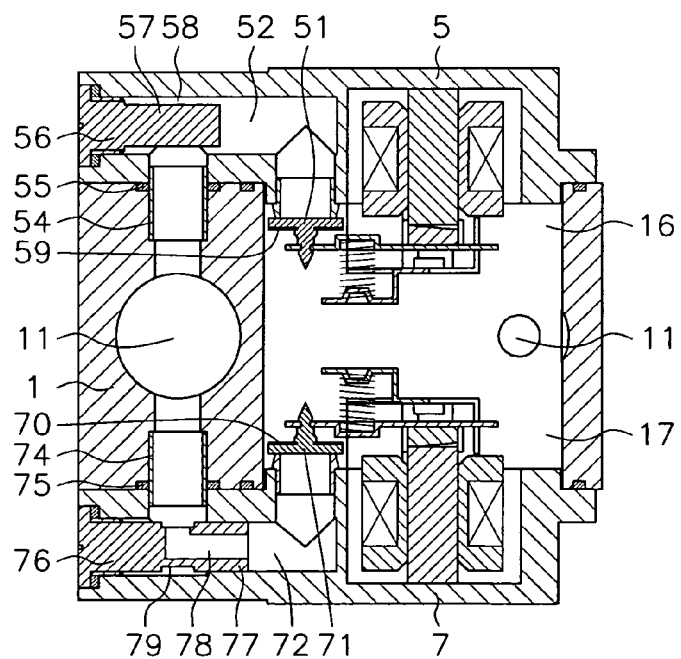
FIG. 10 is similar to FIG. 9 but showing different designs of screws respectively installed in the electromagnetic valves.

Actually, many methods can be employed to achieve change of gas flow rate. For example, as shown in FIG. 10, a screw 56 is fastened to the opening of the through hole 52 in the second electromagnetic valve 5. The screw 56 has a plain extension 57 of diameter smaller than the through hole 52. Therefore, fuel gas is allowed to pass out of the output port 53 of the second electromagnetic valve 5 through the gap 58 in the through hole 52 around the periphery of the plain extension 57. By means of the plain extension 57 of the screw 56, the gas flow rate is changed, i.e., the gas flow rate is indirectly proportional to the outer diameter of the plain extension 57. The screw 76 sealing the opening of the through hole 72 of the third electromagnetic valve 7 can be made having the same design.

Actually, in FIG. 10, the screw 76 is made having an extension 77 and an L-shaped through hole 78 through the extension 77. The outer diameter of the extension 77 is equal to the inner diameter of the through hole 72. The radially extended side of the L-shaped through hole 78 is aimed at the output port 73 of the third electromagnetic valve 7 for enabling fuel gas to pass out of the output port 73 of the third electromagnetic valve 7 through the L-shaped through hole 78 of the screw 76. Further, a groove 79 is provided around the periphery of the extension 77 and disposed in air communication with the output port 73 of the third electromagnetic valve 7. The screw 56 sealing the opening of the through hole 52 of the second electromagnetic valve 5 may be made in this way. Because the gas flow rate passing through the first electromagnetic valve 3 is greater than the second electromagnetic valve 5 and the third electromagnetic valve 7, the screw 36 remains unchanged.

Figure 5:
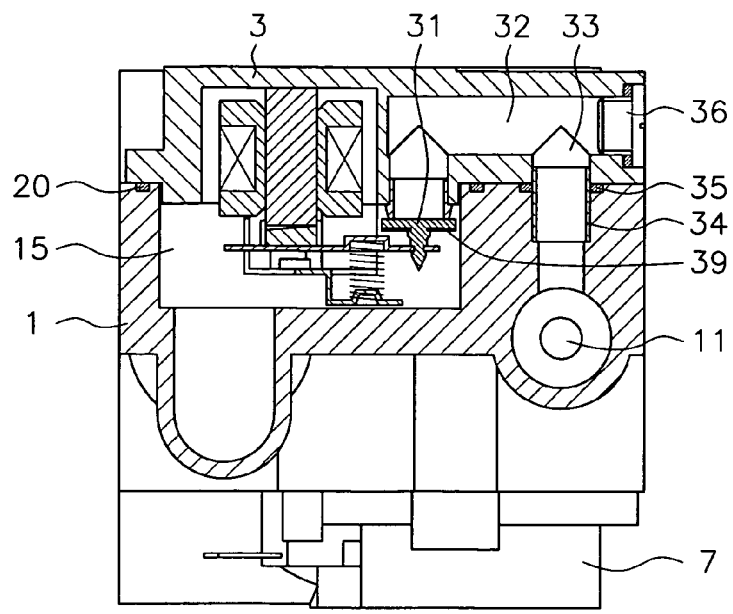
FIG. 5 is a sectional view taken along line B—B of FIG. 3.
Figure 6:
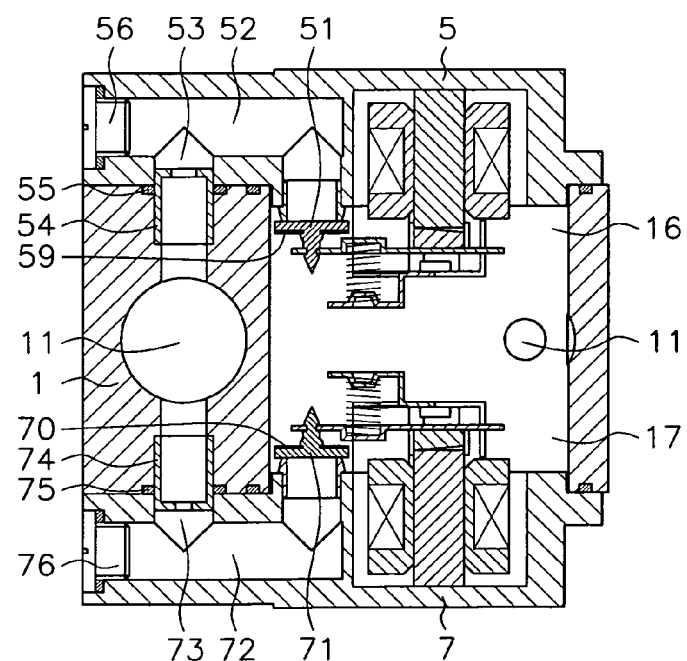
FIG. 6 is a sectional view taken along line C—C of FIG. 3.

Referring to FIGS. 5 and 6, the valve stems 31, 51, and 71 of the electromagnetic valves 3, 5, and 7 are respectively mounted with a washer 39, 59, or 70 that supports the respective valve stem against deformation and enables the respective valve stem to positively seal the corresponding input port of the through hole 32, 52, or 72.

Figure 11:
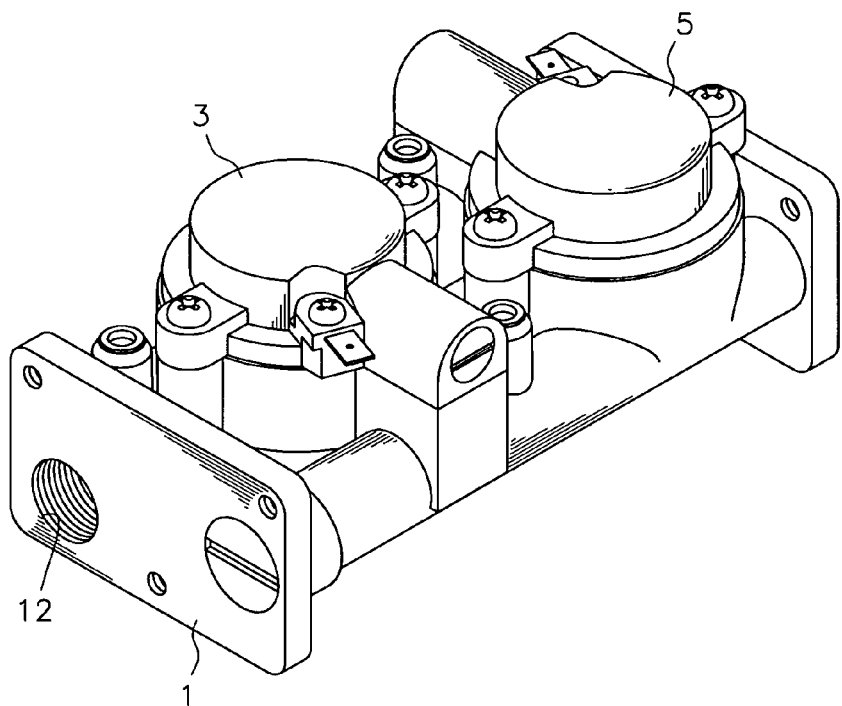
FIG. 11 is an elevational view of an alternate form of the gas control valve assembly according to the present invention.

In another embodiment of the present invention as shown in FIG. 11, the aforesaid third electromagnetic valve 7 is eliminated, and the first and second electromagnetic valves 3 and 5 are used to control gas flow rate. Because only the second electromagnetic valve 5 controls the passage to the second gas outlet 14, the gas flow rate through the gas outlet 14 is constant. A flow rate control valve may be used to regulate the flow rate of fuel gas passing into or out of the gas passageway 11.

Figure 12:
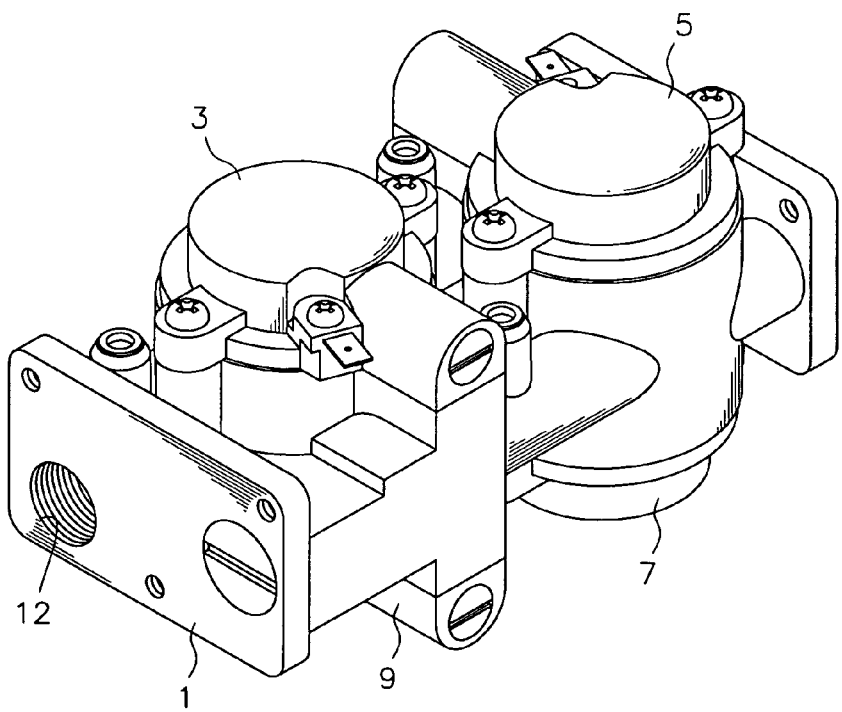
FIG. 12 is an elevational view of another alternate form of the gas control valve assembly according to the present invention.

According to the alternate form shown in FIG. 12, the valve seat 1 of the gas control valve assembly 10 comprises a fourth mounting hole (not shown) aimed at the first mounting hole 15, and a fourth electromagnetic valve 9 mounted in the fourth mounting hole and synchronously operated with the first electromagnetic valve 3 for enabling more amount of fuel gas to pass to the gas passageway 11, i.e., four electromagnetic valves 3, 5, 7, and 9 are used to control and regulate the flow rate of fuel gas.

Figure 13:
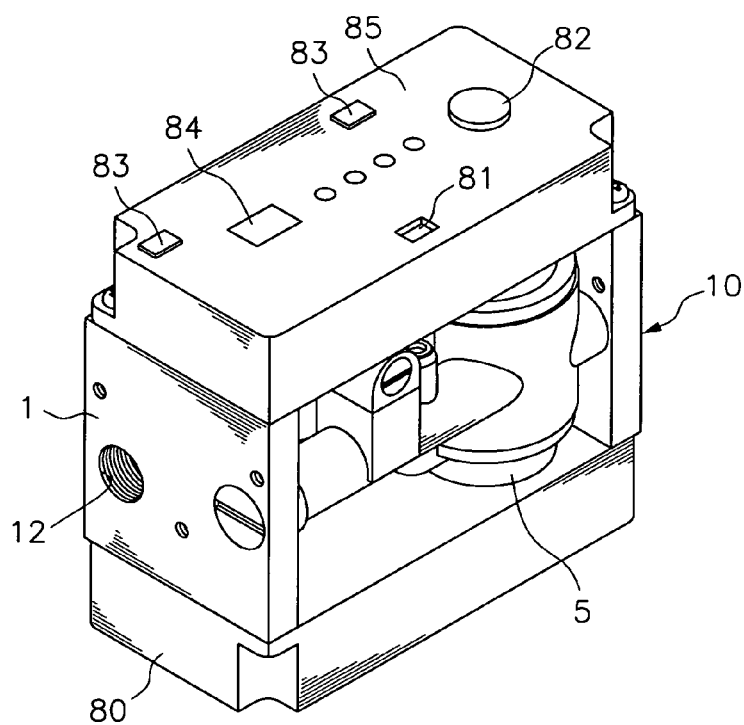
FIG. 13 shows an infrared receiver and an electronic igniter respectively mounted in the front and back sides of the valve seat of the gas control valve assembly according to the present invention.
Figure 14:
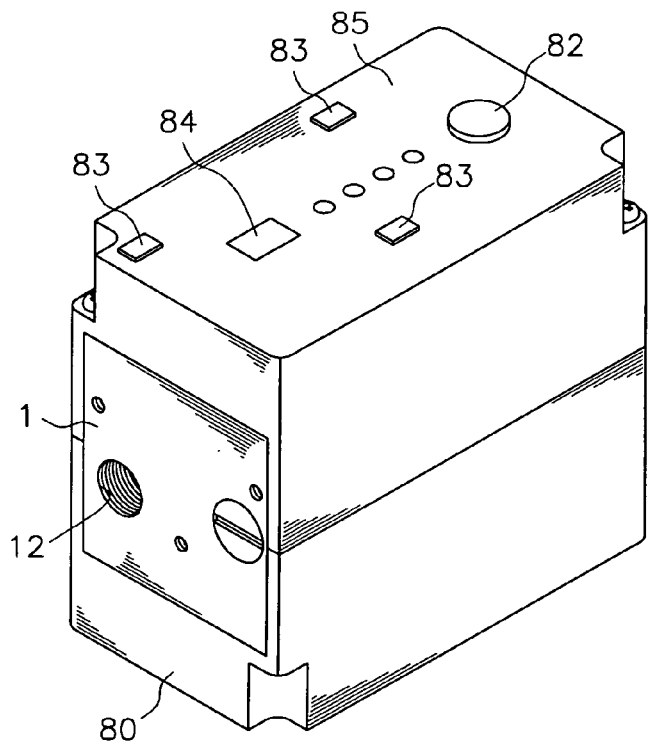
FIG. 14 is similar to FIG. 13 but showing different designs of the infrared receiver and the electronic igniter.

Referring to FIG. 13, the electronic igniter, referenced by 80, is installed in the back side (the bottom side) of the valve seat 1 of the gas control valve assembly 10, and adapted to control the ignition and induction of the gas range and the close/open of the aforesaid electromagnetic valves. The infrared receiver 85 is provided at the top side of the valve seat 1 of the gas control valve assembly 10. The infrared receiver 85 comprises a gas range on/off button 82, a flame control 84 for high fire, medium fire, low fire, and fire off controls in proper order. The infrared receiver 85 and the electronic igniter 80 may be respectively bilaterally extended downwards or upwards to block the lateral sides of the valve seat 1 as shown in FIG. 14, leaving the gas inlet 12 and the gas outlets 13 and 14 exposed to the outside for installation. Further, the infrared receiver 85 has a plurality of tool holes 81 respectively aimed at the detection screws 24 of the gas control valve assembly 10 and respectively sealed with a respective detachable plug 83. Through the tool holes 81, a screwdriver can be inserted to adjust the detection screws 24.

Figure 15:
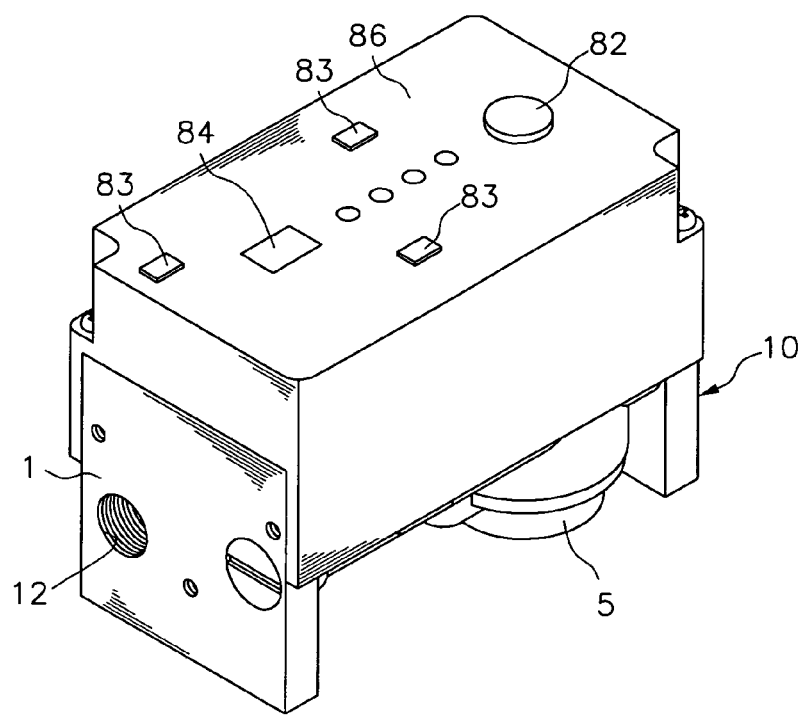
FIG. 15 shows an infrared receiver and an electronic igniter mounted in the front side of the valve seat of the gas control valve assembly according to the present invention.

Referring to FIG. 15, a control box 86 may be used and fastened to the valve seat 1 to hold the aforesaid electronic igniter and infrared receiver on the inside.

Figure 16:
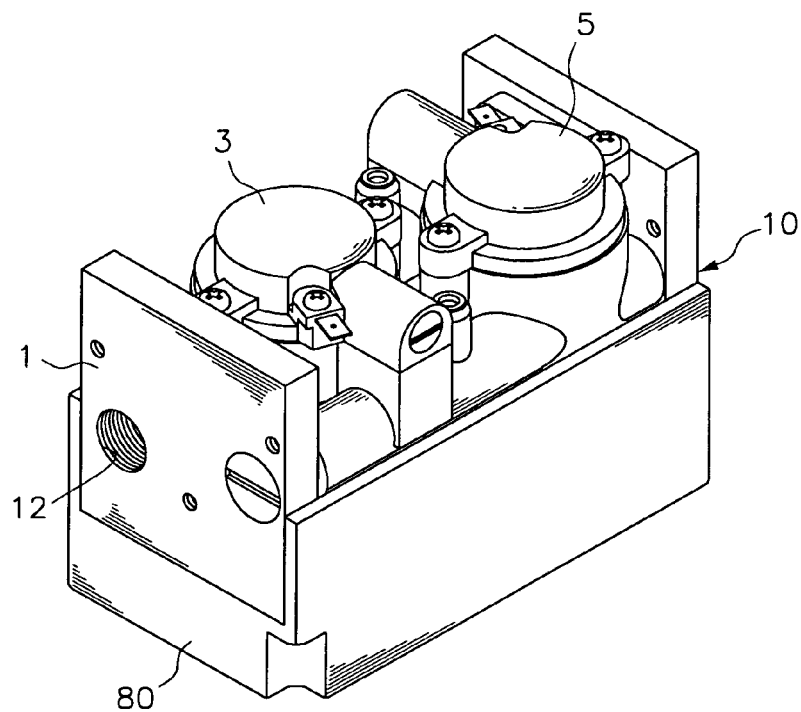
FIG. 16 shows an electronic igniter mounted in the back side of the valve seat of the gas control valve assembly according to the present invention.

Referring to FIG. 16, the aforesaid infrared receiver may be eliminated, and the electronic igniter 80 may be installed in the back side of the valve seat 1. In this case, the gas range on/off button and flame fire control button must be installed in the electronic igniter 80.

A prototype of gas control valve assembly has been constructed with the features of FIGS. 1~16. The gas control valve assembly functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A gas control valve assembly comprising: a valve seat, said valve seat having a gas inlet, at least one gas outlet, a gas passageway in communication between said gas inlet and said at least one gas outlet, and at least one mounting hole disposed between said gas inlet and said at least one gas outlet in air communication with said gas passageway; at least one electromagnetic valve respectively mounted in said at least one mounting hole and adapted to control the flowing of fuel gas through said gas passageway to said at least one gas outlet;

said at least one gas outlet includes a first gas outlet and a second gas outlet; said at least one mounting hole includes a first mounting hole and a second mounting hole; said at least one electromagnetic valve includes a first electromagnetic valve mounted in said first mounting hole and adapted to control the flowing of fuel gas from said gas passageway to said second mounting hole and said first gas outlet, and a second electromagnetic valve mounted in said second mounting hole and adapted to control the flowing of fuel gas from said gas passageway to said second gas outlet;

said at least one mounting hole further comprises a third mounting hole; said at least one electromagnetic valve further comprises a third electromagnetic valve mounted in said third mounting hole and adapted to control the flowing of fuel gas from said gas passageway to said second gas outlet.

2. The gas control valve assembly as claimed in claim 1, wherein said at least one mounting hole further comprises a fourth mounting hole; said at least one electromagnetic valve further comprises a fourth electromagnetic valve mounted in said fourth mounting hole and adapted to work with said first electromagnetic valve synchronously in controlling the flowing of fuel gas from said gas passageway to said second mounting hole and said third mounting hole and said first gas outlet.

3. The gas control valve assembly as claimed in claim 1 wherein said valve seat further comprises at least one screw hole and at least one tapered hole respectively connecting said at least one screw hole to said gas passageway, and at least one detection screw respectively mounted in said at least one screw hole, said at least one detection screw each having a threaded shank threaded into one of said at least one screw hole, a tapered tip axially forwardly extended from said threaded shank and fitting one of said at least one tapered hole, and two cut planes at two sides of said threaded shank.

4. The gas control valve assembly as claimed in claim 1, wherein said at least one electromagnetic valve each comprises a through hole, said through hole having an input port, an output port in communication with said gas passageway, and an adjustment screw threaded into the opening of said through hole and adapted to control gas flow rate through said output port, said adjustment screw having a L-shaped hole formed of a radial section and an axial section in a front extension thereof, said L-shaped hole having a radial section aimed at said output port.

5. The gas control valve assembly as claimed in claim 1, wherein said at least one electromagnetic valve each comprises through hole, said through hole having an input port, an output port in communication with said gas passageway, and an adjustment screw threaded into the opening of said through hole and adapted to control gas flow rate through said output port, said adjustment screw having a front extension suspending in said through hole, said front extension having a diameter smaller than the diameter of said through hole.

6. The gas control valve assembly as claimed in claim 3 wherein said valve seat has a front side mounted with an infrared receiver and a back side mounted with an electronic igniter, said infrared receiver having at least one through hole respectively aimed at said at least one detection screw in said at least one screw hole and respectively sealed with a detachable plug.

7. The gas control valve assembly as claimed in claim 3, wherein said valve seat has a front side mounted with an electronic igniter, said electronic igniter having at least one through hole respectively aimed at said at least one detection screw in said at least one screw hole and respectively sealed with a detachable plug.

8. The gas control valve assembly as claimed in claim 3 wherein said valve seat has a back side mounted with an electronic igniter.

9. The gas control valve assembly as claimed in claim 3, wherein said at least one screw hole is respectively mounted with a respective retainer adapted to stop the respective detection screw from falling out of the respective screw hole.

10. The gas control valve assembly as claimed in claim 3, wherein said at least one screw hole each has a tapered outer end, said tapered outer end having a diameter gradually reduced toward the outside.

11. The gas control valve assembly as claimed in claim 3, wherein said at least one screw hole includes one screw hole connected to said gas passageway between said gas inlet and said first mounting hole.

12. The gas control valve assembly as claimed in claim 4, wherein said adjustment screw has an annular groove extended around the periphery of said front extension across said L-shaped hole.

13. The gas control valve assembly as claimed in claim 4, wherein said at least one electromagnetic valve each comprises a valve stem controlled to close/open said input port of said through hole, and a washer mounted on said valve stem.

14. The gas control valve assembly as claimed in claim 5, wherein said at least one electromagnetic valve each comprises a valve stem controlled to close/open said input port of said through hole, and a washer mounted on said valve stem.

15. The gas control valve assembly as claimed in claim 6, wherein said electronic igniter and said infrared receiver are receive inside a control box being fastened to the front side of said valve seat.

16. The gas control valve assembly as claimed in claim 11, wherein said at least one screw hole includes one screw hole connected to said gas passageway between said first mounting hole and said second mounting hole.

17. The gas control valve assembly as claimed in claim 15, wherein said control box is provided outside said valve seat.

18. The gas control valve assembly as claimed in claim 16, wherein said at least one screw hole includes one screw hole connected to said gas passageway between said second mounting hole and said second gas outlet.

* * * * *